US011536322B2

(12) United States Patent
Iwasaki et al.

(10) Patent No.: US 11,536,322 B2
(45) Date of Patent: Dec. 27, 2022

(54) AUTOMATIC TRANSMISSION (71) Applicant: Mazda Motor Corporation, Hiroshima (JP)

(72) Inventors: Tatsuhiko Iwasaki, Aki-gun (JP); Tatsutoshi Mizobe, Aki-gun (JP); Yoshihiko Fujita, Aki-gun (JP); Keiichi Nakamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/452,537

(22) Filed: Oct. 27, 2021

(65) Prior Publication Data
US 2022/0154783 A1 May 19, 2022

(30) Foreign Application Priority Data
Nov. 13, 2020 (JP) .............................. JP2020-189740

(51) Int. Cl.
*F16D 25/10* (2006.01)
*F16D 25/0638* (2006.01)
(Continued)

(52) U.S. Cl.
CPC ......... *F16D 25/10* (2013.01); *F16D 25/0638* (2013.01); *F16D 2121/04* (2013.01); *F16D 2127/02* (2013.01)

(58) Field of Classification Search
CPC ............ F16D 25/10; F16D 2021/0661; F16D 25/0638; F16D 13/52
See application file for complete search history.

(56) References Cited

U.S. PATENT DOCUMENTS

2009/0170652 A1\* 7/2009 Ishii ...................... F16D 13/683
475/271
2013/0075216 A1\* 3/2013 Seo ......................... F16D 25/12
192/48.601
(Continued)

FOREIGN PATENT DOCUMENTS

DE 102020102361 A1 \* 8/2021
JP 2015172378 A 10/2015
(Continued)

OTHER PUBLICATIONS

Machine translation of KR2005002220 obtained from espacenet Jun. 24, 2022 (Year: 2022).\*

(Continued)

*Primary Examiner* — Stacey A Fluhart
(74) *Attorney, Agent, or Firm* — Alleman Hall Creasman & Tuttle LLP (57) ABSTRACT

An automatic transmission has a one-side clutch and an other-side clutch in an axial direction, the one-side clutch and the other-side clutch being aligned in the axial direction on an axis of a power transmission shaft. These clutches respectively include: drum sections; hub sections; friction plates that are engaged in an axially slidable manner between the drum sections and the hub sections; and pistons that press the friction plates. The friction plates in the one-side and other-side clutches are arranged in parallel in the axial direction. The pistons in the one-side clutch and the other-side clutch are arranged on one sides in the axial direction of the friction plates and are arranged such that axial positions thereof overlap. The piston in the other-side clutch penetrates the friction plate in the one-side clutch in the axial direction.

10 Claims, 5 Drawing Sheets

(51) Int. Cl.
    *F16D 127/02*     (2012.01)
    *F16D 121/04*     (2012.01)

(56)     References Cited

U.S. PATENT DOCUMENTS

| | | | |
|---|---|---|---|
| 2021/0277958 A1* | 9/2021 | Park | B60K 6/38 |
| 2021/0301883 A1* | 9/2021 | Hindi | F16D 13/68 |

FOREIGN PATENT DOCUMENTS

| | | | | |
|---|---|---|---|---|
| KR | 20050027220 A | * | 3/2005 | F16D 21/06 |
| WO | WO-2020259746 A1 | * | 12/2020 | H02K 15/066 |

OTHER PUBLICATIONS

Machine translation of WO2020259746 obtained from espacenet Jun. 24, 2022 (Year: 2022).*

* cited by examiner

AUTOMATIC TRANSMISSION

TECHNICAL FIELD

The present invention relates to an automatic transmission that is mounted on a vehicle.

BACKGROUND ART

In recent years, automatic transmissions are provided with multiple gears for purposes of improving fuel efficiency and the like of vehicles. In conjunction therewith, the number of planetary gear sets constituting a gear shift mechanism tends to be increased. However, when the number of the planetary gear sets is increased, an axial dimension of the entire transmission is increased, which produces a problem of mountability.

Meanwhile, in an automatic transmission that is disclosed in JP2015-172378A, for example, three hydraulic clutches for switching a power transmission path of the gear shift mechanism are coaxially superimposed on an inner side and an outer side in a radial direction. In this way, compared to a case where these clutches are aligned in an axial direction, the axial dimension of the entire transmission is reduced.

SUMMARY OF THE INVENTION

Problem to be Solved by the Invention

However, in the automatic transmission disclosed in JP2015-172378A, the plurality of clutches are aligned on the inner side and the outer side in the radial direction. Accordingly, compared to the case where the clutches are aligned in the axial direction, a radial dimension of the entire transmission is increased. As a result, the transmission possibly interferes with a body component, such as a driveshaft, that is arranged on the radially outer side of the transmission.

The present disclosure has a purpose of providing an automatic transmission that includes a plurality of clutches and can suppress an increase in an axial dimension of the automatic transmission while suppressing an increase in dimension of the automatic transmission in a radial direction of the clutches.

Means for Solving the Problem

In order to solve the above problem, an automatic transmission according to the present disclosure is configured as follows.

The present disclosure provides an automatic transmission which has a one-side clutch in an axial direction and an other-side clutch in the axial direction, the one-side clutch and the other-side clutch being aligned in the axial direction on an axis of a power transmission shaft, each of the clutches including: a cylindrical drum section; a cylindrical hub section that opposes the drum section; a friction plate that is engaged between the drum section and the hub section in an axially slidable manner; and a piston that presses the friction plate.

The friction plate in the one-side clutch and the friction plate in the other-side clutch are arranged in parallel in the axial direction. The piston in the one-side clutch and the piston in the other-side clutch are arranged on one side in the axial direction of the friction plate in the one-side clutch and are arranged such that the axial positions thereof overlap. The piston in the other-side clutch penetrates the friction plate in the one-side clutch in the axial direction.

According to the present disclosure, the piston in the other-side clutch penetrates the friction plate in the one-side clutch. Thus, it is possible to arrange the piston in the one-side clutch and the piston in the other-side clutch in an axially overlapping manner while arranging the friction plate in the one-side clutch and the friction plate in the other-side clutch in parallel in the axial direction.

In this way, compared to a case where the one-side clutch and the other-side clutch overlap in the axial direction, it is possible to suppress an increase in radial dimension of the automatic transmission. In addition, compared to a case where the pistons are aligned in parallel in the axial direction, it is possible to reduce an axial dimension of the automatic transmission.

The other-side clutch may be a first other-side clutch that is arranged on the one-side clutch side, and the automatic transmission may further include a second other-side clutch that is arranged on the other side in the axial direction of the first other-side clutch, the piston in the first other-side clutch may penetrate the friction plate in the one-side clutch in the axial direction, and a piston in the second other-side clutch may penetrate the friction plate in the one-side clutch and the friction plate in the first other-side clutch in the axial direction.

With this configuration, the piston in the second other-side clutch penetrates the friction plate in the one-side clutch and the friction plate in the first other-side clutch. Accordingly, also in the case where the friction plates in the three clutches are provided in parallel in the axial direction, it is possible to suppress the increase in the radial dimension of the automatic transmission in comparison with a case where the one-side clutch and the first and second other-side clutches overlap in the axial direction, and it is possible to reduce the axial dimension of the automatic transmission in comparison with a case where the pistons are aligned in the axial direction.

In addition, the piston in the second other-side clutch penetrates the friction plate in the one-side clutch and the friction plate in the first other-side clutch. Accordingly, also in a state where the pistons in the three clutches overlap in the axial direction while the friction plates in the three clutches are provided in parallel in the axial direction, it is possible to press the friction plate in the second other-side clutch that is located farthest on the other side in the axial direction.

The drum section in the one-side clutch and the drum section in the other-side clutch may be formed as separate bodies and may be configured to rotate integrally. The drum section in the other-side clutch may include a retaining support section that is located between the friction plate in the other-side clutch and the friction plate in the one-side clutch, that extends radially inward from an inner circumferential side of the drum section in the other-side clutch, and that restrains sliding of the friction plate in the one-side clutch to the other axial side.

When a clutch is engaged, the friction plate is pressed by the piston and slides in the axial direction. An axial load that is applied to the friction plate from the piston is received by the restraining member that is arranged on an opposite side of the piston by interposing the friction plate between the piston and the restraining member and that is fixed to the drum section. Thus, it is preferred to reduce an offset amount in the radial direction between a pressing point and the restraining member.

More specifically, in the case where the pressing point by the piston is provided on a radially inner side of the friction plate with respect to the restraining member, which is provided on an outer circumferential side of the friction plate, it is more difficult to restrain axial movement of a radially inner portion of the friction plate than axial movement of a radially outer portion of the friction plate. As a result, during engagement, an axial moving distance of an inner circumferential portion of the friction plate becomes longer than an axial moving distance of an outer circumferential portion of the friction plate, which possibly deforms the friction plate itself, and possibly deforms the restraining member in conjunction with the deformation of this friction plate.

Meanwhile, since the piston in the other-side clutch penetrates the radially outer portion of the friction plate in the one-side clutch in the present disclosure, the radial positions of the restraining member and the pressing point are offset in the one-side clutch. However, since the restraining member for restraining the axial movement of the friction plate is constructed of the retaining support section that has sufficiently higher rigidity than a snap ring provided to the drum section in the other-side clutch, for example, it is possible to suppress the deformation of the restraining member that is associated with the deformation of the friction plate caused by offsetting of the radial positions of the pressing point and the restraining member.

The other-side clutch may include a return spring that urges the piston to a disengagement side, the friction plate of the other-side clutch may be one of a plurality of friction plates, and the return spring may be arranged between an adjacent two of the plurality of friction plates in the other-side clutch.

With this configuration, the return spring for the piston on the outermost radial side, which is arranged to overlap in the axial direction, is arranged between the friction plates. Thus, for example, even in the case where the spring cannot be arranged due to a lack of the sufficient radial dimension, it is possible to reduce the radial dimension of the automatic transmission.

A first penetration position, at which the piston in the first other-side clutch penetrates the friction plate in the one-side clutch, and a second penetration position, at which the piston in the second other-side clutch penetrates the friction plate in the one-side clutch, may be located in a misaligned manner in a circumferential direction.

With this configuration, for example, in the case where a through hole is provided to cause each of the pistons to penetrate the plurality of friction plates, it is possible to suppress the lack of the rigidity of the plurality of friction plates in the one-side clutch in comparison with a case where the through holes for the piston in the first other-side clutch and the piston in the second other-side clutch are provided at the same circumferential positions in the plurality of friction plates.

Advantage of the Invention

According to the present disclosure, it is possible to provide the automatic transmission that includes the plurality of clutches and suppresses the increase in the axial dimension of the automatic transmission while suppressing the increase in the dimension of the automatic transmission in the radial direction of the clutches.

MODES FOR CARRYING OUT THE INVENTION

A description will hereinafter be made on an embodiment of the present disclosure.

Figure 1:
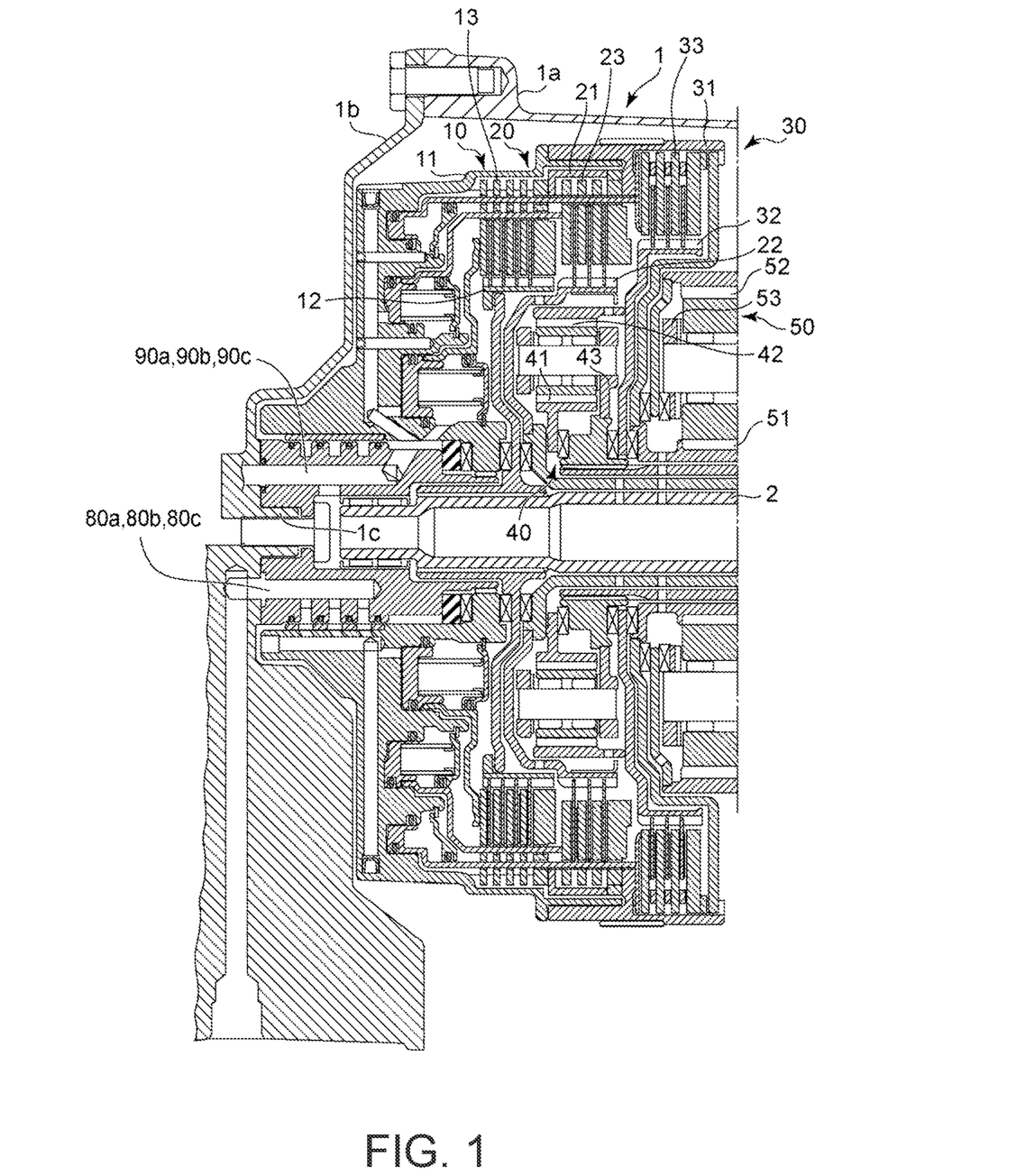
FIG. 1 is a cross-sectional view of a rear portion of an automatic transmission according to an embodiment of the present disclosure.

FIG. 1 illustrates a configuration of an automatic transmission on an opposite side of a drive source (hereinafter, the opposite side of the drive source will be referred to as a rear side or one axial side, and a drive source side will be referred to as a front side or an other axial side). In a rear portion of a transmission case 1 having: a body case 1a; and an end cover 1b that closes an opening at a rear end of the body case 1a, on an input shaft 2 that extends from the drive source side, a first clutch 10 as a one-side clutch, a second clutch 20 as a first other-side clutch, a third clutch 30 as a second other-side clutch, and first and second planetary gear sets 40, 50 are disposed from the rear side. The first clutch 10, the second clutch 20, and the third clutch 30 respectively include a plurality of friction plates 13, 23, 33 that are aligned in the axial direction. The first and second planetary gear sets 40, 50 are aligned in the axial direction.

The first and second planetary gear sets 40, 50 have, as rotary elements, sun gears 41, 51, ring gears 42, 52, and pinion carriers 43, 53, respectively.

The first, second, and third clutches 10, 20, 30 respectively have: drum members 11, 21, 31 as the drum sections that are joined and rotate integrally during engagement; and hub members 12, 22, 32 as the hub sections. The drum member 31 in the third clutch 30 that is located farthest on the other axial side (the drive source side) is connected to the sun gear 51 in the second planetary gear set 50. The hub member 32 in the third clutch 30 is coupled to the ring gear 42 in the first planetary gear set 40.

The drum member 21 in the second clutch 20 is arranged on the one axial side of the drum member 31 in the third clutch 30. The drum member 21 is connected to the drum members 11, 31 in the first and third clutches 10, 30 in a manner to integrally rotate therewith. The drum member 21 is spline-fitted to an inner circumferential side of the drum member 11 in the first clutch 10. The drum member 11 in the first clutch 10 is press-fitted into an inner circumferential side of the drum member 31 in the third clutch 30. The drum member 21 is connected to the sun gear 51 in the second planetary gear set 50 via the drum members 11, 31 in the first and third clutches 10, 30. The hub member 22 in the second clutch 20 is coupled to a ring gear in another planetary gear set, which is not illustrated.

On the one axial side of the drum member 21 in the second clutch 20, the drum member 11 in the first clutch 10 is integrally formed with an other-side extending section 11e, which will be described below, and to which the drum member 21 in the second clutch 20 is spline-fitted. The drum member 11 in the first clutch 10 is connected to the sun gear 51 in the second planetary gear set 50 via the drum member 31 in the third clutch 30. The hub member 12 in the first clutch 10 is coupled to the input shaft 2 of the automatic transmission.

Next, a description will be made on configurations of the first, second, and third clutches 10, 20, 30 with reference to FIG. 2 and FIG. 3. FIG. 3 is an exploded perspective view of pistons, friction plates, and the drum members constituting the first to third clutches 10, 20, 30.

The first, second, and third clutches 10, 20, 30 respectively have, in addition to the drum members 11, 21, 31 and the hub members 12, 22, 32: the plurality of friction plates 13, 23, 33 that are aligned in the axial direction therebetween and alternately spline-engaged with the drum members 11, 21, 31 and the hub members 12, 22, 32, respectively; pistons 14, 24, 34 that are arranged behind (on the one axial side) of these friction plates 13, 23, 33, respectively; and hydraulic chambers 15, 25, 35 that are provided in back portions of the pistons 14, 24, 34. When an engagement pressure is supplied to these hydraulic chambers 15, 25, 35, in the clutches 10, 20, 30 to which the engagement pressure is supplied, the pistons 14, 24, 34 press the friction plates 13, 23, 33 and join the drum members 11, 21, 31 to the hub members 12, 22, 32. In this way, the clutches 10, 20, 30 are engaged.

In the first, second, and third clutches 10, 20, 30, cancellation chambers 16, 26, 36 are provided on opposite sides of the hydraulic chambers 15, 25, 35, by interposing the pistons 14, 24, 34 between the cancellation chambers 16, 26, 36 and the hydraulic chambers 15, 25, 35. The cancellation chambers 16, 26, 36 are provided to prevent dragging of the friction plates 13, 23, 33 that occurs when the friction plates 13, 23, 33 are pressed by centrifugal forces that are applied to hydraulic oil in the hydraulic chambers 15, 25, 35 in a disengaged state. As a result, when the pistons 14, 24, 34 are pressed by the centrifugal forces that are applied to the hydraulic oil supplied to the cancellation chambers 16, 26, 36, pressing forces that are generated by the centrifugal forces applied to the hydraulic oil in the hydraulic chambers 15, 25, 35 are canceled.

In the cancellation chambers 16, 26 of the first clutch 10 and the second clutch 20, return springs 17, 27 are disposed to urge the pistons 14, 24 in a clutch disengagement direction, respectively. In the third clutch 30, an urging member 37, which will be described below, is arranged between the plurality of friction plates 33.

The plurality of friction plates 13, 23, 33 in the first, second, and third clutches 10, 20, 30 include: a plurality of outer friction plates 13a, 23a, 33a that are spline-engaged with the drum members 11, 21, 31; and a plurality of inner friction plates 13b, 23b, 33b that are spline-engaged with the hub member 12 and are alternately arranged with the plurality of outer friction plates 13a, 23a, 33a in the axial direction.

The drum member 11 in the first clutch 10 includes: an outer cylindrical section 11a with which the outer friction plate 13a is engaged; an extending section 11b that further extends to the one axial side from an end portion on the one axial side of the outer cylindrical section 11a; a vertical wall section 11c that extends radially inward from an end portion of the extending section 11b; and a cylindrical section 11d that extends to the one axial side and the other axial side from an inner end portion on a radially inner side of the vertical wall section 11c.

The hub member 12 in the first clutch 10 includes: an inner cylindrical section 12a with which the inner friction plate 13b is engaged; a disc section 12b that extends radially inward from an end portion on the one axial side of the inner cylindrical section 12a; and a spline section 12c that extends to the one axial side and the other axial side from an inner end portion of the disc section 12b and is spline-fitted to the input shaft 2.

As illustrated in FIG. 3, a spline section 13a1 that is spline-engaged with the outer cylindrical section 11a is provided on an outer circumferential surface of the outer friction plate 13a, and a spline section 13b1 that is spline-engaged with the inner cylindrical section 12a is provided on an inner circumferential surface of the inner friction plate 13b.

In a radially outer portion of the outer friction plate 13a, a plurality of first through holes 13c and a plurality of second through holes 13d are provided. The first through holes 13c are provided to cause the piston 24 in the second clutch 20 to pass therethrough in the axial direction. The second through holes 13d are provided to cause the piston 34 in the third clutch 30 to pass therethrough in the axial direction.

The plurality of first through holes 13c and the plurality of second through holes 13d are aligned at equally spaced intervals in a circumferential direction, and each of the first through holes 13c is arranged at a different circumferential position from corresponding one of the second through holes 13d. In detail, a circumferentially central portion of each of the first through holes 13c and a circumferentially central portion of each of the second through holes 13d that is adjacent to a respective one of the first through holes 13c are provided in a state where circumferential positions thereof are misaligned. In this embodiment, a circumferential position of one end portion in the circumferential direction of each of the first through holes 13c overlaps a circumferential position of the other end portion in the circumferential direction of the corresponding one of the second through holes 13d that is adjacent to the respective first through hole 13c. However, the one end portion may not overlap the other end portion.

Figure 2:
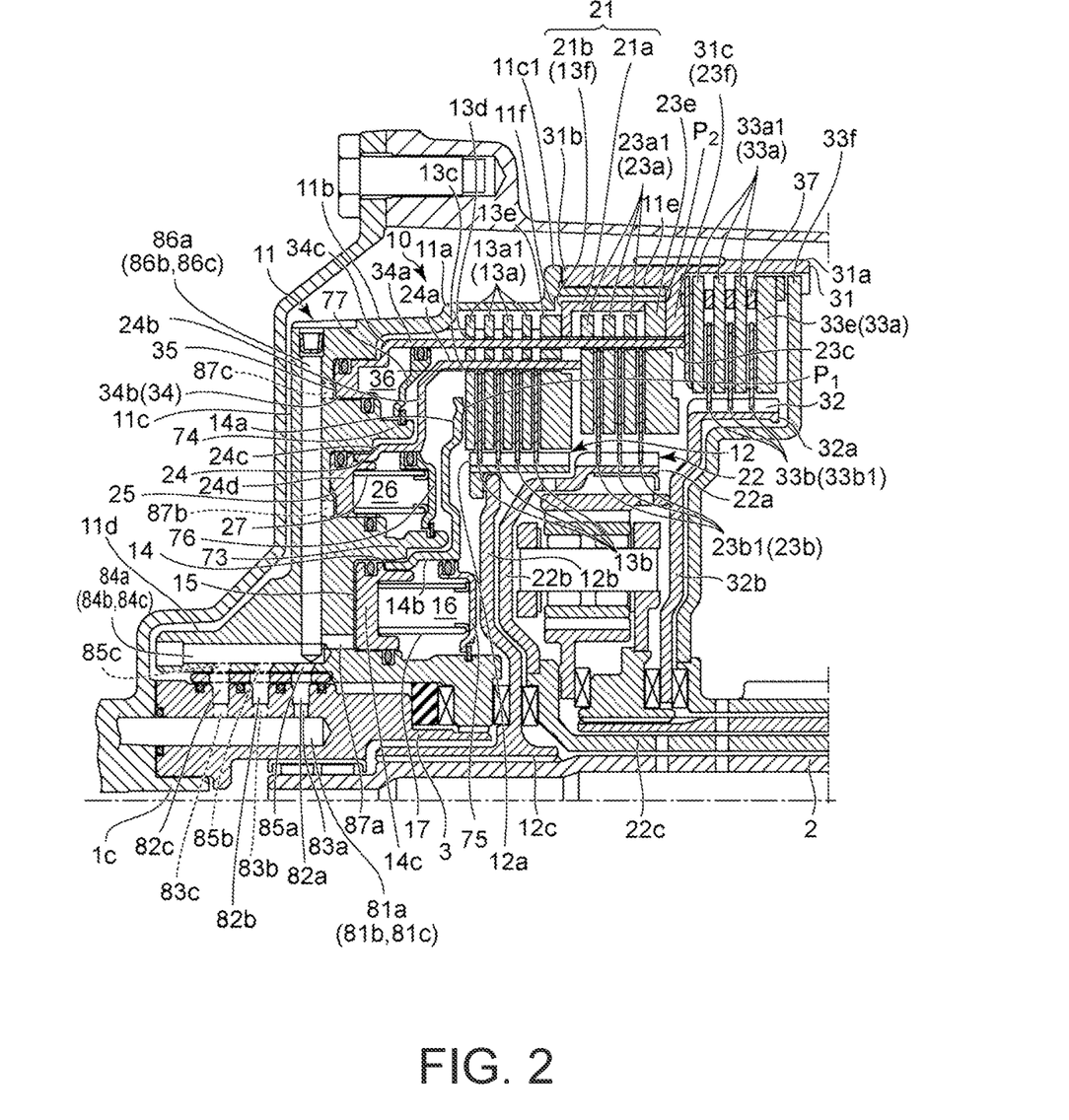
FIG. 2 is an enlarged view of a main section in FIG. 1.
Figure 3:
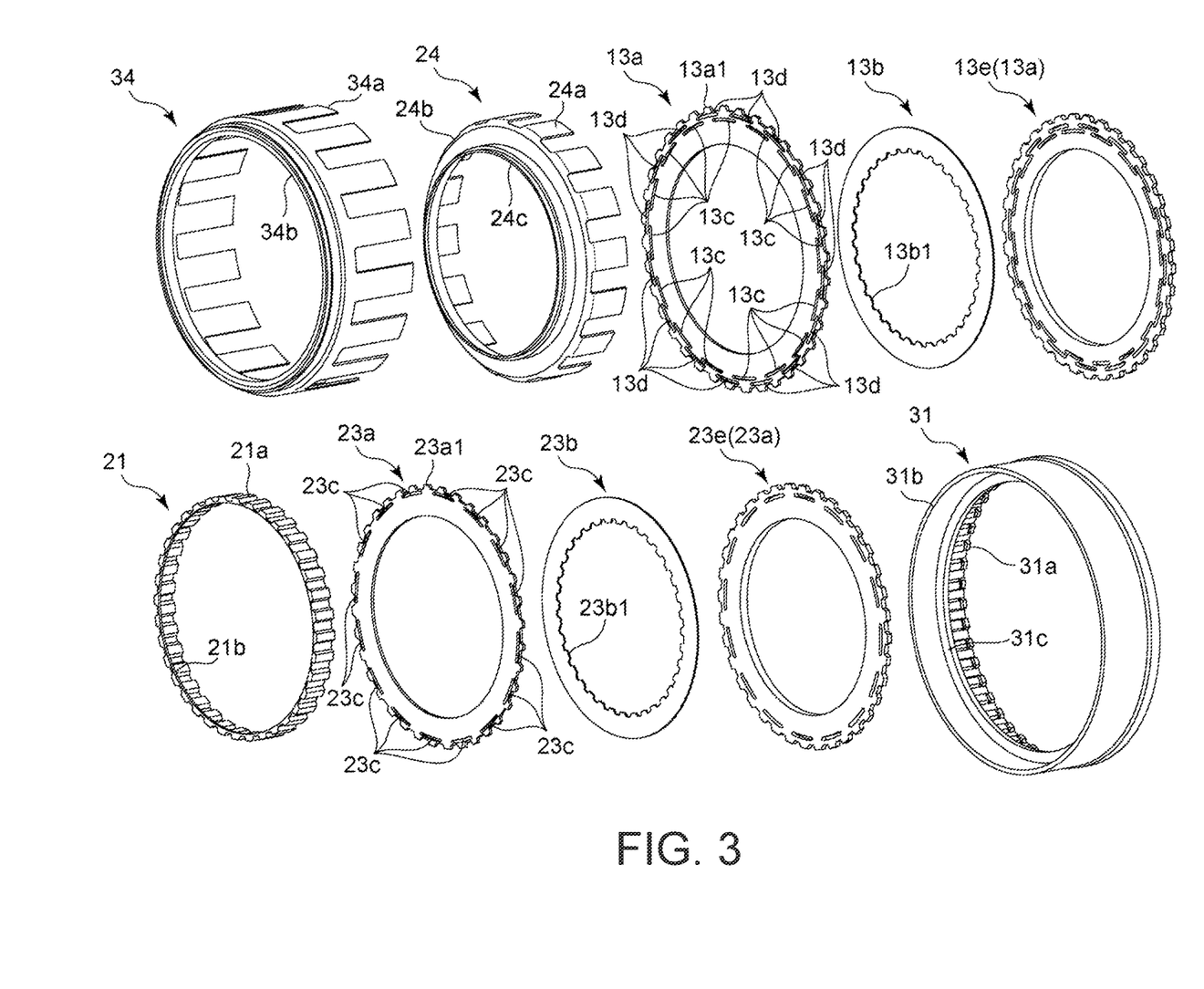
FIG. 3 is an exploded perspective view of pistons and friction plates in first to third clutches.

As illustrated in FIG. 2, a radial position of each of the first through holes 13c is located on an outer side of an outer circumference of respective one of the inner friction plates 13b. A radial position of each of the second through holes 13d is located on an outer circumferential side of the radial position of respective one of the first through holes 13c and is located on a radially inner side of the spline section 13a1.

The piston 14 has: a pressing section 14a that is arranged on the one axial side of the friction plates 13a, 13b, extends in the radial direction, and presses the friction plates 13a, 13b during the engagement; a cylindrical section 14b that extends to the one axial side from an inner end portion of the pressing section 14a; and a pressure-receiving section 14c that includes a pressure-receiving surface for receiving a hydraulic pressure supplied to the hydraulic chamber 15. In this embodiment, the pressing section 14a and the cylindrical section 14b are constructed of a different body from the pressure-receiving section 14c. The cylindrical section 14b is coupled to an upper end portion of the pressure-receiving section 14c that is formed in a disc shape.

Since the hydraulic chamber 15 is arranged such that a radial position thereof is offset from the friction plates 13a, 13b, radial positions of the pressing section 14a and the pressure-receiving section 14c in the piston 14 are also offset in a similar manner.

As described above, on a radially inner side of the spline section 13a1 in the outer friction plate 13a, a radial dimension for providing the first and second through holes 13c, 13d is necessary. Accordingly, a radial position of the spline section 13a1 and a radial position of a pressing point $P_1$, at which the pressing section 14a of the piston 14 presses the friction plate 13a, are also offset.

Of the plurality of friction plates 13, the outer friction plate that is located farthest on the other axial side constitutes a retaining member 13e. An axial dimension (a plate thickness) of the entire retaining member 13e is set to be greater than a plate thickness of each of the other outer friction plates. The retaining member 13e is set such that a radially inner portion, in particular, a portion corresponding to the pressing point $P_1$, at which the piston 14 abuts the outer friction plate 13a, is thicker than a radially outer portion.

A restraining member 13f that restrains axial movement of each of the friction plates 13 is arranged on the other axial side of the retaining member 13e. In this embodiment, a flange section 21b is provided in an end portion on the one axial side of the drum member 21 in the second clutch 20, which will be described below (an adjacent position to the retaining member 13e in the first clutch 10), and the flange section 21b extends to substantially the same radial position as an outer circumference of the first through hole 13c in the radial direction. This flange section 21b is used as the restraining member 13f that is the retaining support section.

The restraining member 13f is fixed to the outer cylindrical section 11a in a state not being able to move in the axial direction. Accordingly, the restraining member 13f receives the axial load that is applied to the friction plate 13. That is, the pressing point $P_1$, to which the pressing force of the piston 14 is applied, in the friction plate 13 and the restraining member 13f that receives the axial load are offset from each other in the radial direction.

As described above, the restraining member 13f is constructed of the flange section 21b of the drum member 21 in the second clutch 20. Thus, for example, compared to a case where a thin member such as a snap ring is used as the restraining member, rigidity of the restraining member itself is increased. The rigidity of the restraining member 13f is increased just as described. Accordingly, even in the case where the pressing point $P_1$ at the time of receiving the axial load and the restraining member 13f are offset, deformation of the restraining member 13f is suppressed. As a result, deformation of the friction plate 13, which is associated with the deformation of the restraining member 13f, is suppressed.

As illustrated in FIG. 2, the drum member 21 in the second clutch 20 includes: an outer cylindrical section 21a, with which the outer friction plate 23a is engaged; and the flange section 21b that extends radially inward from an end portion on the one axial side of the outer cylindrical section 21a. An outer circumferential surface of the outer cylindrical section 21a is spline-fitted to the other-side extending section 11e that extends to the other axial side from the outer cylindrical section 11a in the first clutch 10. The other-side extending section 11e extends to the other axial side from the outer cylindrical section 21a, and a retaining member 23e, which will be described below, is spline-fitted to a portion of the other-side extending section 11e on the other axial side from the outer cylindrical section 21a. When a surface on the other axial side of the outer cylindrical section 21a abuts a surface on the one axial side of the retaining member 23e, an axial position of the drum member 21 is determined.

The other-side extending section 11e is located on the radially outer side of the outer cylindrical section 11a, a step section 11f is formed between the outer cylindrical section 11a and the other-side extending section 11e, and a back surface (a surface on the one axial side) of the flange section 21b abuts the step section 11f. As described above, the flange section 21b extends to a position near an outer circumference of the second through hole 13d in the outer friction plate 13a of the first clutch 10, and thus is projected radially inward from the outer cylindrical section 11a.

The hub member 22 includes: an inner cylindrical section 22a with which the inner friction plate 23b is engaged; a disc section 22b that extends radially inward from an end portion on the one axial side of the inner cylindrical section 22a; and a power transmission section 22c that extends to the one axial side from an inner end portion of the disc section 22b and is coupled to another rotary element.

As illustrated in FIG. 3, a spline section 23a1 that is spline-engaged with the outer cylindrical section 21a is provided on an outer circumferential surface of the outer friction plate 23a, and a spline section 23b1 that is spline-engaged with the inner cylindrical section 22a is provided on an inner circumferential surface of the inner friction plate 23b.

In a radially outer portion of the outer friction plate 23a, a plurality of third through holes 23c are provided to cause the piston 34 in the third clutch 30, which will be described below, to pass therethrough in the axial direction.

The plurality of third through holes 23c are aligned at equally spaced intervals in the circumferential direction and are provided such that a circumferential position of each of third through holes 23c corresponds to a circumferential position of respective one of the second through holes 13d. Each of the third through holes 23c is arranged such that the circumferential position thereof matches the circumferential position of respective one of the second through holes 13d.

A radial position of each of the third through holes 23c is located on an outer side of an outer circumference of the inner friction plate 23b and is located on a radially inner side of the spline section 23a1. A radial position of the outer circumference of the inner friction plate 23b is located on the radially outer side of the first through hole 13c (see FIG. 2).

The piston 24 has: a pressing section 24a that is arranged on the one axial side of the plurality of friction plates 13 in the first clutch 10 and is formed in a comb tooth shape extending in the axial direction; a radial section 24b that extends radially inward from an end portion on the one axial side of the pressing section 24a; a cylindrical section 24c that further extends to the one axial side from an inner end portion of the radial section 24b; and a pressure-receiving section 24d that includes a pressure-receiving surface for receiving the hydraulic pressure supplied to the hydraulic chamber 25. In this embodiment, the pressing section 24a, a pair of the radial section 24b and the cylindrical section 24c, and the pressure-receiving section 24d are constructed of different bodies. An end portion on the one axial side of the cylindrical section 24c is coupled to an upper end portion of the pressure-receiving section 24d that is formed in a disc shape.

An end portion on the other axial side of the pressing section 24a is arranged next to the one axial side of the friction plate 23 and presses the friction plate 23 during the engagement. The pressing section 24a is formed in the comb tooth shape so as to correspond to the first through holes 13c in the plurality of friction plates 13. The pressing section 24a penetrates the first through holes 13c, and the piston 24 thereby meshes with the plurality of friction plates 13. The radial section 24b is arranged such that an axial position thereof does not interfere with the piston 14 in the first clutch 10 during the engagement.

Since the hydraulic chamber 25 is arranged such that a radial position thereof is offset from the friction plate 23, radial positions of the pressing section 24a and the pressure-receiving section 24d in the piston 24 are also offset in a similar manner.

As described above, on a radially inner side of the spline section 23a1 in the outer friction plate 23a, a radial dimension for providing the third through hole 23c is necessary. Accordingly, a radial position of the spline section 23a1 and a radial position of a pressing point $P_2$, at which the pressing section 24a of the piston 24 presses the friction plate 23, are also offset.

Similar to the first clutch 10, of the plurality of friction plates 23, the outer friction plate 23a that is located farthest on the other axial side constitutes the retaining member 23e. An axial dimension (a plate thickness) of the entire retaining member 23e is set to be greater than a plate thickness of the other outer friction plate 23a. The retaining member 23e is set such that the plate thickness of a radially inner portion is greater than that of a radially outer portion.

A restraining member 23f (in this embodiment, the drum member 31 in the third clutch 30) that restrains the axial movement of each of the friction plates 13 is arranged on the other axial side of the retaining member 23e.

Here, the drum member 31 in the third clutch 30 has: a cylindrical section 31a with which the outer friction plate 33a is engaged as illustrated in FIG. 2; and a press-fitted section 31b that extends to the one axial side from an end portion on the one axial side of the cylindrical section 31a and is press-fitted into an outer circumferential surface of the other-side extending section 11e in the first clutch 10.

The drum member 31 has a radially projected section 31c that extends radially inward from an end portion on the other axial side of the cylindrical section 31a (a position next to the retaining member 23e in the second clutch 20). The radially projected section 31c extends to a radial position that substantially corresponds to the outer circumference of the second through hole 13d.

A convex section 11c1 that is projected radially outward is provided in an end portion on the other axial side of the other-side extending section 11e, and functions as a stopper that an end surface on the one axial side of the press-fitted section 31b in the third clutch 30 abuts. Since the radially projected section 31c is provided in the drum member 31, the radially projected section 31c is used as the restraining member 23f that does not move in the axial direction and restrains the axial movement of the friction plate 23 in the second clutch 20.

As illustrated in FIG. 2, as described above, the drum member 31 in the third clutch 30 has: the cylindrical section 31a with which the outer friction plate 33a is engaged; the cylindrical press-fitted section 31b that further extends to the one axial side from the cylindrical section 31a; and the radially projected section 31c that is provided between the cylindrical section 31a and the press-fitted section 31b. The drum member 31 is formed to have a T-shaped cross section by the cylindrical section 31a, the press-fitted section 31b, and the radially projected section 31c.

As described above, the radially projected section 31c extends to a position near an outer circumference of the third through hole 23c in the outer friction plate 23a of the second clutch 20, and thus is projected radially inward from the outer cylindrical section 21a.

The hub member 32 includes: a cylindrical section 32a with which the inner friction plate 33b is engaged; and a disc section 32b that extends radially inward from an end portion on the one axial side of the cylindrical section 32a.

Similar to the first and second clutches 10, 20, a spline section 33a1 that is spline-engaged with the cylindrical section 31a is provided on an outer circumferential surface of the outer friction plate 33a, and a spline section 33b1 that is spline-engaged with the cylindrical section 32a is provided on an inner circumferential surface of the inner friction plate 33b.

In the third clutch 30, the urging member 37 that is constructed of a conical spring or the like is disposed between each adjacent pair of the outer friction plates 33a, and the urging member 37 is provided to elastically urge the adjacent outer friction plate 33a in a separating direction. Each of these urging members 37 is arranged on the outer circumferential side of the inner friction plate 33b.

The urging member 37 is provided such that a clutch clearance is divided into each adjacent pair of the outer friction plates. In addition, each of these urging members 37 also functions as a return spring that causes the piston 34 to move to an opposite side of the friction plate.

The piston 34 has: a pressing section 34a that is arranged on the one axial side of the plurality of friction plates 13 in the first clutch 10 and is formed in the comb tooth shape extending in the axial direction; and a pressure-receiving section 34b that is arranged on a radially inner side of the pressing section 34a and includes a pressure-receiving surface for receiving the hydraulic pressure supplied to the hydraulic chamber 35.

An inner circumferential surface of the pressing section 34a is located on a radially outer side of an outer circumferential surface of the pressure-receiving section 34b, and a connection section 34c is provided between the pressing section 34a and the pressure-receiving section 34b. An end portion on the other axial side of the pressing section 34a is arranged next to the one axial side of the friction plate 33 and presses the friction plate 33 during the engagement.

As illustrated in FIG. 3, the pressing section 34a is formed in the comb tooth shape so as to correspond to the second through holes 13d and the third through holes 23c in the plurality of friction plates 13, 23. That is, the pressing section 34a penetrates the second through holes 13d and the third through holes 23c, and the piston 34 thereby meshes with the plurality of friction plates 13, 23.

Similar to the first clutch 10, of the plurality of friction plates 33, the outer friction plate 33a that is located farthest on the other axial side constitutes the retaining member 33e. An axial dimension (a plate thickness) of the entire retaining member 33e is set to be greater than a plate thickness of the other outer friction plate 33a. A restraining member 33f that restrains the axial movement of each of the friction plates 13 is arranged on the other axial side of the retaining member 33e.

The hydraulic chambers 15, 25, 35 and the cancellation chambers 16, 26, 36 in the first, second, and third clutches 10, 20, 30 are formed by using the drum member 11 in the first clutch 10. Next, a description will be made on configurations of these hydraulic chambers and cancellation chambers 15, 25, 35, 16, 26, 36.

A boss section 1c that extends forward along a rotation centerline is provided in the end cover 1b constituting the transmission case 1, and a sleeve member 3 is fixedly fitted to an outer circumference of the boss section 1c. The drum member 11 includes: the extending section 11b that extends to the one axial side from the outer cylindrical section 11a; the vertical wall section 11c that extends radially inward from the end portion on the one axial side of the extending section 11b and is arranged such that a surface on the one axial side opposes a surface on the other axial side of the end cover 1b; and the cylindrical section 11d that extends in the axial direction in the end portion on the radially inner side of the vertical wall section 11c. In the drum member 11, the cylindrical section 11d is fitted to the outer circumference of the sleeve member 3 in a freely rotatable manner. In this way, the drum member 11 is supported in the freely rotatable manner by the boss section 1c of the end cover 1b via the sleeve member 3.

The drum member 11 includes a first cylinder section 73 and a second cylinder section 74 that have cylindrical shapes respectively extending forward from an intermediate portion and an outer circumferential portion in the radial direction of a front surface of the vertical wall section 11c. The piston 14 in the first clutch 10 is fitted between an outer circumferential surface of the cylindrical section 11d and an inner circumferential surface of the first cylinder section 73, the piston 24 in the second clutch 20 is fitted between an outer circumferential surface of the first cylinder section 73 and an inner circumferential surface of the second cylinder section 74, and furthermore the piston 34 in the third clutch 30 is fitted between an outer circumferential surface of the second cylinder section 74 and an inner circumferential surface of the extending section 11b of the vertical wall section 11c.

The hydraulic chamber 15 in the first clutch 10 is formed in an oil sealed state by the outer circumferential surface of the cylindrical section 11d, the front surface of the vertical wall section 11c, the inner circumferential surface of the first cylinder section 73, and a back surface of the pressure-receiving section 14c. The hydraulic chamber 25 in the second clutch 20 is formed in the oil sealed state by the front surface of the vertical wall section 11c, the outer circumferential surface of the first cylinder section 73, the inner circumferential surface of the second cylinder section 74, and a back surface of the pressure-receiving section 24d. The hydraulic chamber 35 in the third clutch 30 is formed in the oil sealed state by the front surface of the vertical wall section 11c, the inner circumferential surface of the extending section 11b, the outer circumferential surface of the second cylinder section 74, and a back surface of the pressure-receiving section 34b.

The cancellation chamber 16 in the first clutch 10 is formed in the oil sealed state by a rear surface of a seal plate 75 that is attached to a front portion of the outer circumferential surface of the cylindrical section 11d, the outer circumferential surface of the cylindrical section 11d, a front surface of the pressure-receiving section 14c, and an inner circumferential surface of the cylindrical section 14b. The cancellation chamber 26 in the second clutch 20 is formed in the oil sealed state by a rear surface of a seal plate 76 that is attached to a front portion of the outer circumferential surface of the first cylinder section 73, the outer circumferential surface of the first cylinder section 73, a front surface of the pressure-receiving section 24d, and an inner circumferential surface of the cylindrical section 24c. The cancellation chamber 36 in the third clutch 30 is formed in the oil sealed state by a rear surface of a seal plate 77 that is attached to a front portion of the outer circumferential surface of the second cylinder section 74, the outer circumferential surface of the second cylinder section 74, a front surface of the pressure-receiving section 34b, and an inner circumferential surface of the connection section 34c.

In the cancellation chambers 16, 26 of the first clutch 10 and the second clutch 20, each of the return springs 17, 27 is disposed between the seal plate 75 and respective one of the pistons 14, 24, and each of the pistons 14, 24 is urged in the clutch disengagement direction. As described above, the return spring 37 in the third clutch 30 is arranged between the plurality of friction plates 33a.

Here, the vertical wall section 11c is provided to be orthogonal to an axis, and an inner circumferential portion, an intermediate portion, and an outer circumferential portion of this vertical wall section 11c respectively form the rear surfaces of the hydraulic chambers 15, 25, 35 in the clutches. Accordingly, the hydraulic chambers 15, 25, 35 overlap each other in the axial direction, the hydraulic chamber 25 in the second clutch 20 is superimposed on the outer circumferential side of the hydraulic chamber 15 of the first clutch 10, and the hydraulic chamber 35 in the third clutch 30 is superimposed on the outer circumferential side of the hydraulic chamber 25.

The cancellation chambers 16, 26, 36, which are respectively provided in front of the hydraulic chambers 15, 25, 35 by interposing the pistons 14, 24, 34 therebetween, in the clutches 10, 20, 30 also overlap each other in the axial direction, the cancellation chamber 26 in the second clutch 20 is superimposed on the outer circumferential side of the cancellation chamber 16 of the first clutch 10, and the cancellation chamber 36 in the third clutch 30 is superimposed on the outer circumferential side of the cancellation chamber 26.

In addition, the vertical wall section 11c of the drum member 11 is provided with: engagement hydraulic oil supply passages 80a, 80b, 80c used to supply engagement hydraulic oil to the hydraulic chambers 15, 25, 35 in the first, second, and third clutches 10, 20, 30, respectively; and cancellation hydraulic oil supply passages 90a, 90b, 90c that respectively supply centrifugal cancellation hydraulic oil to the cancellation chambers 16, 26, 36. Next, a description will be made on these oil passages 80a, 80b, 80c, 90a, 90b, 90c with reference to FIG. 2, FIG. 4, and FIG. 5.

First, a description will be made on the engagement hydraulic oil supply passages 80a, 80b, 80c in the first, second, and third clutches 10, 20, 30.

As illustrated in FIG. 2, in the sleeve member 3 that is fitted to the boss section 1c of the end cover 1b, first axial oil passages 81a, 81b, 81c for the first, second, and third clutches (only the oil passage 81a for the first clutch is illustrated) are provided at different circumferential positions, and each of the first axial oil passages 81a, 81b, 81c extends in the axial direction from a control valve unit, which is not illustrated.

An outer circumferential surface of the sleeve member 3 is provided with circumferential grooves 82a, 82b, 82c for the first, second, and third clutches. The first axial oil passages 81a, 81b, 81c for the clutches respectively communicate with the circumferential grooves 82a, 82b, 82c by radial communication passages 83a, 83b, 83c (only the communication passage 83a for the first clutch is illustrated) that are formed in the sleeve member 3.

Figure 5:
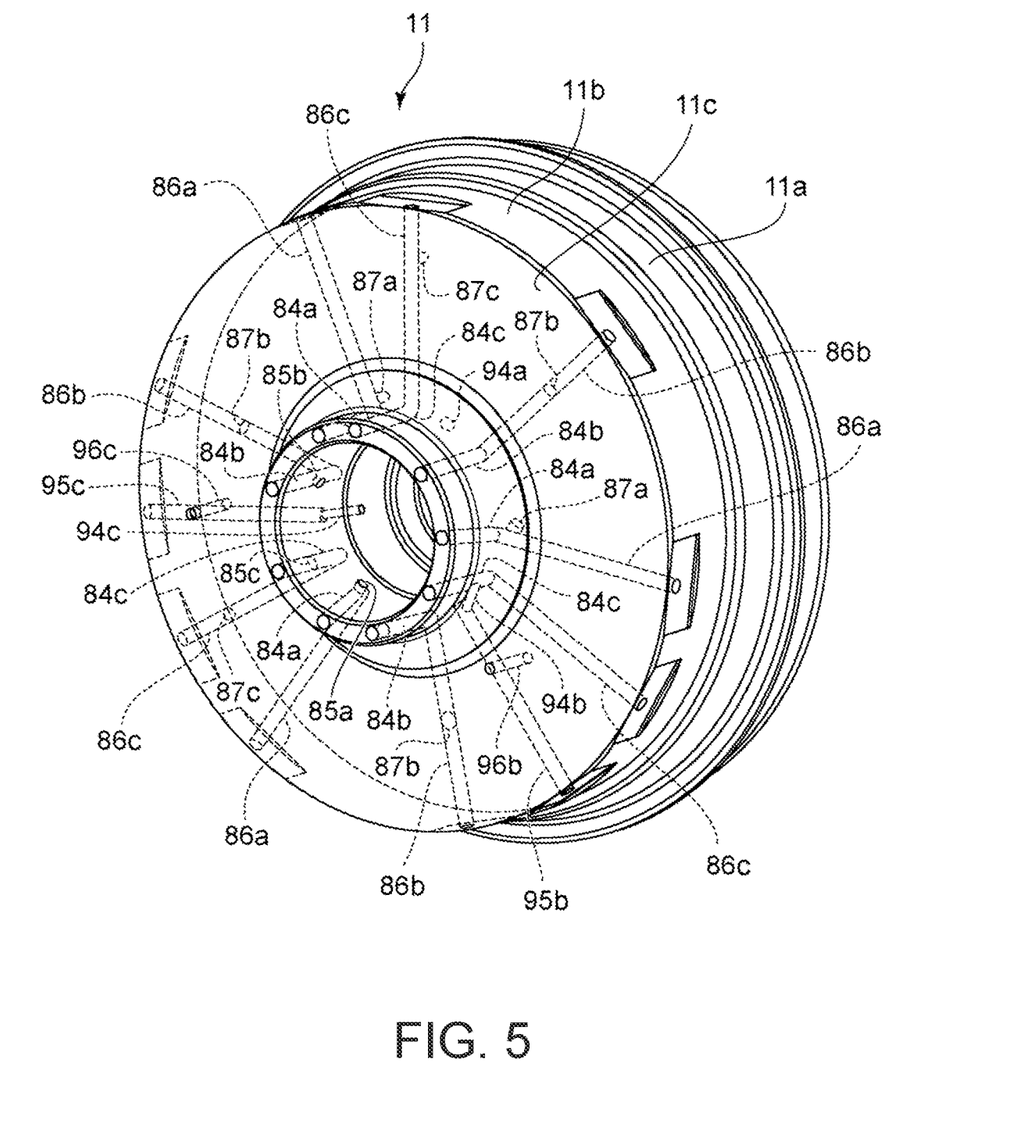
FIG. 5 is a perspective view of a drum member.

As illustrated in FIG. 2 and FIG. 5, the cylindrical section 11d of the drum member 11 is provided with second axial oil passages 84a, 84b, 84c, each of which extends in the axial direction, for the first, second, and third clutches at different circumferential positions.

In an inner circumference portion of the cylindrical section 11d, communication holes 85a, 85b, 85c for the first, second, and third clutches are provided to respectively communicate the circumferential grooves 82a, 82b, 82c for the clutches with the second axial oil passages 84a, 84b, 84c.

In the vertical wall section 11c of the drum member 11, radial oil passages 86a, 86b, 86c for the clutches are provided to extend radially outward in the vertical wall section 11c, and respectively communicate with the second axial oil passages 84a, 84b, 84c, an inner end portion of each of which is provided in the cylindrical section 11d, for the clutches.

The radial oil passages 86a, 86b, 86c for the first, second, and third clutches are respectively provided with openings 87a, 87b, 87c that are opened in the axial direction at specified positions on a radially inner circumferential side of these passages, at specified positions in intermediate portions thereof, and specified positions on the outer circumferential side thereof. The openings 87a, 87b, 87c respectively communicate these radial oil passages 86a, 86b, 86c with the hydraulic chambers 15, 25, 35 of the first, second, and third clutches 10, 20, 30.

In this way, the engagement hydraulic oil supply passage 80a is formed from the radial oil passage (not illustrated) in the end cover 1b to the hydraulic chamber 15 in the first clutch 10 via the first axial oil passage 81a in the sleeve member 3, the communication passage 83a, the circumferential groove 82a, the communication hole 85a, the second axial oil passage 84a, the radial oil passage 86a, and the opening 87a.

Similarly, the engagement hydraulic oil supply passage 80b is formed from the first axial oil passage 81b to the hydraulic chamber 25 of the second clutch 20 via the communication passage 83b, the circumferential groove 82b, the communication hole 85b, the second axial oil passage 84b, the radial oil passage 86b, and the opening 87b. Furthermore, the engagement hydraulic oil supply passage 80c is formed from the first axial oil passage 81c to the hydraulic chamber 35 of the third clutch 30 via the communication passage 83c, the circumferential groove 82c, the communication hole 85c, the second axial oil passage 84c, the radial oil passage 86c, and the opening 87c.

In such a case, these hydraulic oil supply passages 80a, 80b, 80c are used to axially supply the engagement hydraulic oil to the hydraulic chambers 15, 25, 35 when the openings 87a, 87b, 87c are opened in the axial direction.

Next, a description will be made on the cancellation hydraulic oil supply passages 90a, 90b, 90c used to supply the hydraulic oil to the cancellation chambers 16, 26, 36 of the first, second, and third clutches 10, 20, 30.

Figure 4:
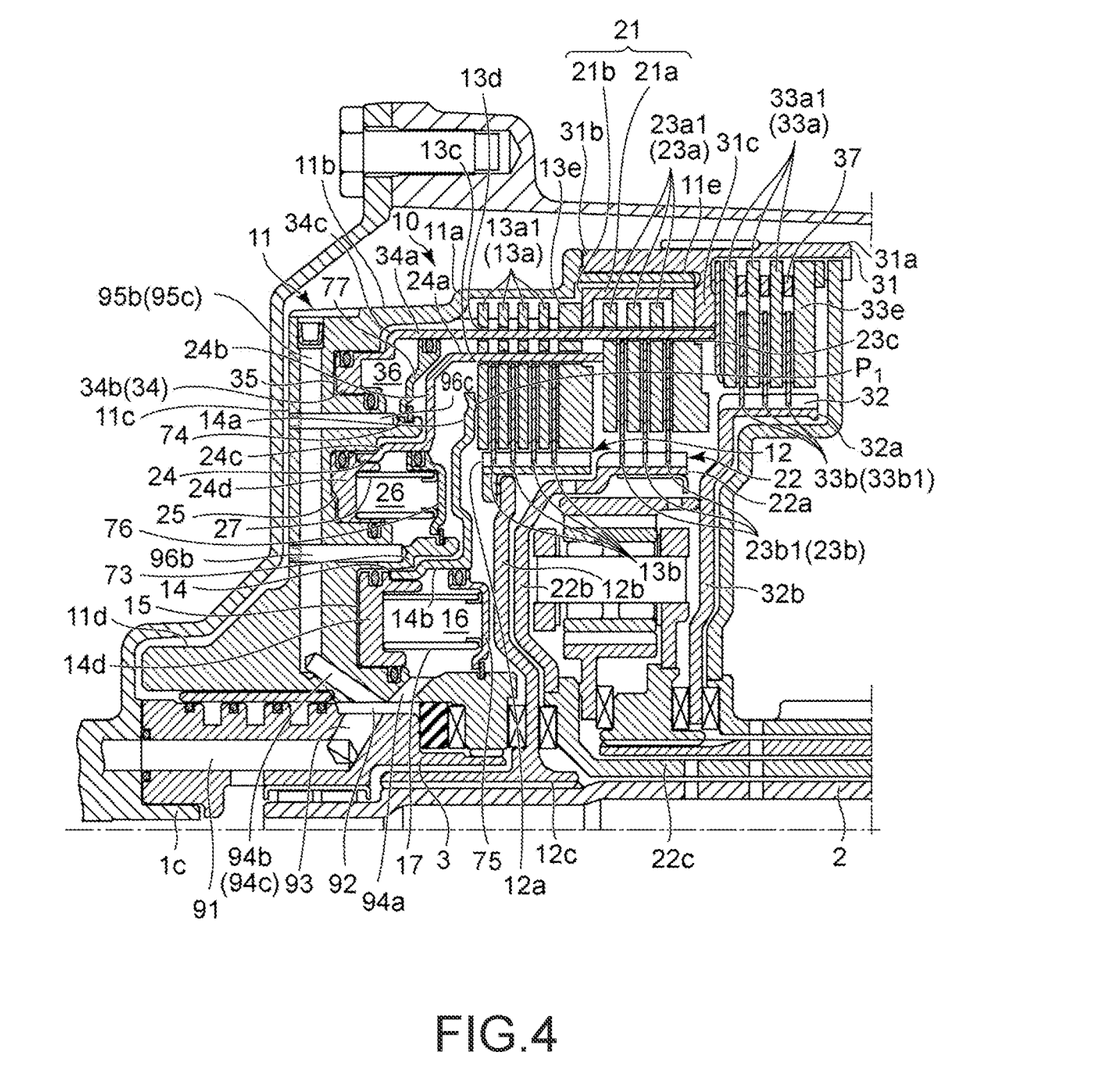
FIG. 4 is an enlarged view of another main section in FIG. 1.

As illustrated in FIG. 4, in the sleeve member 3, an axial oil passage 91 is provided to extend in the axial direction from the control valve unit, which is not illustrated.

On the outer circumferential surface of the sleeve member 3, a step-down section 92 is provided on the other axial side of the circumferential grooves 82a, 82b, 82c of the clutches and communicates with the axial oil passage 91 via a first communication passage 93 in the radial direction. The first communication passage 93 is formed in the sleeve member 3.

As illustrated in FIG. 4 and FIG. 5, the cylindrical section 11d is provided with a second communication passage 94a. The second communication passage 94a extends in the radial direction in a manner to be inclined forward as extending from the radially inner side to the radially outer side so as to communicate with the step-down section 92, and communicates an inner circumferential surface and the outer circumferential surface of the cylindrical section 11d. An opening of the second communication passage 94a on the outer circumferential surface side of the cylindrical section faces radially outward and inside of the cancellation chamber 16 of the first clutch 10 from the inner circumferential side.

In this way, the cancellation hydraulic oil supply passage 90a is configured to extend from the axial oil passage 91 to the cancellation chamber 16 of the first clutch 10 via the first communication passage 93, the step-down section 92, and the second communication passage 94a.

In the vertical wall section 11c of the drum member 11, radial oil passages 95b, 95c for disengagement of the second and third clutches 20, 30 are provided to extend radially outward within the vertical wall section 11c. Inner end portions of the radial oil passages 95b, 95c respectively communicate with second communication passages 94b, 94c that communicate between the radial oil passages 95b, 95c and the step-down section 92. The second communication passages 94b, 94c are provided to extend radially in a manner to be inclined to the rear side from the radially inner side to the radially outer side, and are provided at different circumferential positions.

The radial oil passages 95b, 95c are respectively provided with openings 96b, 96c that are opened in the axial direction at a specified position in an intermediate portion in the radial direction and a specified position on the outer circumferential side of these oil passages. The openings 96b, 96c respectively communicate these radial oil passages 95b, 95c with the cancellation chambers 26, 36 of the second and third clutches 20, 30.

In this way, the cancellation hydraulic oil supply passage 90b is configured to extend from the axial oil passage 91 to the cancellation chamber 26 of the second clutch 20 via the first communication passage 93, the step-down section 92, and the second communication passage 94b, the radial oil passage 95b, and the opening 96b. Similarly, the cancellation hydraulic oil supply passage 90c is configured to extend from the axial oil passage 91 to the cancellation chamber 36 of the third clutch 30 via the first communication passage 93, the step-down section 92, and the second communication passage 94c, the radial oil passage 95b, and the opening 96b.

Next, a description will be made on action of the automatic transmission according to this embodiment. First, when the engagement pressure (the engagement hydraulic oil) is supplied to the hydraulic chamber 15 of the first clutch 10 via the engagement hydraulic oil supply passage 80a, the first clutch 10 is engaged, and the input shaft 2 is joined to the sun gear 51 of the second planetary gear set 50.

When the engagement pressure is supplied to the hydraulic chamber 25 of the second clutch 20 via the engagement hydraulic oil supply passage 80b, the second clutch 20 is engaged, and the ring gear of the other planetary gear, which is not illustrated, is joined to the sun gear 51 of the second planetary gear set 50.

When the engagement pressure is supplied to the hydraulic chamber 35 of the third clutch 30 via the engagement hydraulic oil supply passage 80c, the third clutch 30 is engaged, and the ring gear 42 of the first planetary gear set 40 is joined to the sun gear 51 of the second planetary gear set 50.

Meanwhile, the centrifugal cancellation hydraulic oil is constantly supplied to the cancellation chambers 16, 26, 36 of the clutches 10, 20, 30 through the cancellation hydraulic oil supply passages 90a, 90b, 90c. Due to the pressing force, which is generated by the centrifugal force applied to this hydraulic oil, to press the pistons 14, 24, 34, the pressing force, which is generated by the hydraulic oil in the hydraulic chambers 15, 25, 35 of the clutches 10, 20, 30 in the disengaged states, to press the pistons 14, 24, 34 in an engagement direction is canceled. In this way, dragging of the friction plates 13, 23, 33 of the clutches 10, 20, 30 in the disengaged states is prevented. As a result, an increase in rotational resistance, wear of the friction plates 13, 23, 33, and the like caused by the dragging are suppressed.

In particular, in the automatic transmission of this embodiment, the pressing section 24a of the piston 24 in the second clutch 20 penetrates the first through holes 13c that are provided in the outer friction plate 13a of the first clutch 10. Thus, the pressing section 24a can press the plurality of friction plates 23, which are arranged on the other axial side of the plurality of friction plates 13 of the first clutch 10, in the second clutch 20.

The pressing section 34a of the piston 34 in the third clutch 30 penetrates the second through holes 13d in the outer friction plate 13a of the first clutch 10 and the third through holes 23c in the outer friction plate 23a of the second clutch 20. Thus, the pressing section 34a can press the plurality of friction plates 33, which are arranged on the other axial side of the plurality of friction plates 23 of the second clutch 20, in the third clutch 30.

In this way, it is possible to arrange the pistons 14, 24, 34 of the first, second, and third clutches 10, 20, 30 in the overlapping manner in the axial direction while arranging the friction plates 13, 23, 33 of the first, second, and third clutches 10, 20, 30 in parallel in the axial direction.

As a result, compared to a case where the friction plates 13, 23, 33 of the first, second, and third clutches 10, 20, 30 overlap each other in the axial direction, it is possible to reduce the radial dimension of the automatic transmission. In addition, compared to a case where, in addition to the friction plates 13, 23, 33, the pistons 14, 24, 34, the hydraulic chambers 15, 25, 35, and the cancellation chambers 16, 26, 36 are arranged in parallel in the axial direction, it is possible to reduce an axial dimension of the automatic transmission.

By the way, when the clutch is engaged, the friction plate is pressed by the piston and slides in the axial direction. Since the axial load that is applied to the friction plate from the piston is received by the restraining member, an offset amount in the radial direction between the pressing point and the restraining member is preferably reduced as much as possible.

More specifically, in the case where the pressing point by the piston is provided on the radially inner side of the friction plate with respect to the restraining member, which is provided on the outer circumferential side of the friction plate, it is more difficult to restrain the axial movement of the radially inner portion of the friction plate than the axial movement of the radially outer portion of the friction plate. As a result, during the engagement, a moving distance of the inner circumferential portion of the friction plate in the axial direction becomes longer than a moving distance of the outer circumferential portion of the friction plate in the axial direction, which is possibly deformed the friction plate itself, and the restraining member is possibly deformed in association with the deformation of this friction plate.

However, since the through holes, through which the pistons 24, 34 in the second and third clutches 20, 30 pass, are provided on the radially outer side of the friction plate 13 in the first clutch 10, the spline section and the pressing point $P_1$ are offset.

Meanwhile, in this embodiment, the restraining member 13f, which restrains the axial movement of the friction plate 13, is constructed of the member that has the sufficiently higher rigidity than the snap ring such as the drum member 21 in the second clutch 20. Thus, the deformation of the restraining member, which is associated with the deformation of the friction plate 13 caused by offsetting of the radial positions of the pressing point $P_1$ and the restraining member 13f, is suppressed.

In addition, the lower end portion of the restraining member 13f is located on the radially inner side of the spline section 13a1 and on the outer circumference of the second through hole 13d. Accordingly, the radial position (the pressing point $P_1$), at which the pressing force of the piston 14 is applied, in the friction plate 13 is located near the radially inner end portion of the retaining support section (the flange section 21b in the second clutch 20), which receives the pressing force. In this way, the deformation of the friction plate 13, which is caused by offsetting of the radial positions thereof, is suppressed.

Furthermore, as described above, the axial dimension (the plate thickness) of the entire retaining member 13e is set to be greater than the axial dimension of the other outer friction plate 13a, and the plate thickness of the radially inner portion is set to be greater than the plate thickness of the radially outer portion. Thus, it is possible to further effectively suppress the deformation of the friction plate 13.

Similar to the friction plate 13 in the first clutch 10, since the through holes 23c, through which the piston 34 in the third clutch 30 passes, are provided in the friction plate 23 of the second clutch 20, the cylindrical section of the drum member 21 and the pressing point $P_2$ are offset. However, since the restraining member 23f is constructed of the member that has the sufficiently higher rigidity than the snap ring such as the drum member 31 in the third clutch 30, the deformation of the restraining member 23f, which is associated with the deformation of the friction plate 13 caused by offsetting of the radial positions of the pressing point $P_2$ and the restraining member 23f (31c), is suppressed.

In addition, since the lower end portion of the restraining member 23f is located on the radially inner side of the spline section 23a1 and on the outer circumference of the third through hole 23c, the radial position (the pressing point $P_2$), to which the pressing force of the piston 24 is applied, in the friction plate 23 is made close to the position of the radially inner end portion of the retaining support section (the radially projected section 31c of the third clutch 30), which receives the pressing force. In this way, the deformation of the friction plate 23, which is caused by offsetting of the radial positions thereof, is suppressed.

Furthermore, as described above, the axial dimension (the plate thickness) of the entire retaining member 23e is set to be greater than the axial dimension of the other outer friction plate 23a, and the plate thickness of the radially inner portion is set to be greater than the plate thickness of the radially outer portion. Thus, it is possible to further effectively suppress the deformation of the friction plate 23.

Moreover, as described above, the urging member 37 is arranged between each adjacent pair of the outer friction plates 33a of the third clutch 30, and functions as the return spring. In this way, for example, compared to the case where the radial dimension is secured to arrange the return spring in the cancellation chamber 36 of the third clutch 30, the radial dimension can be reduced.

More specifically, in the case where the urging member such as the coil spring is arranged in the cancellation chamber 36, the cancellation chamber needs to have the radial dimension capable of accommodating the return spring with a diameter that is determined by requirements such as required weight and buckling distortion. Meanwhile, since the urging member 37 is arranged between each adjacent pair of the outer friction plates 33a, an increase in the radial dimension of the cancellation chamber 36 is suppressed.

As described above, the first through hole 13c and the second through hole 13d of the first clutch 10 are arranged at the different circumferential positions. Thus, compared to a case where the circumferential positions of these through holes 13c, 13d match each other, the rigidity of the friction plate 13a is easily secured.

As it has been described so far, according to this automatic transmission, regions in the axial direction and the radial direction that are occupied by the clutches 10, 20, 30 are appropriately set. Thus, even in the case where an additional planetary gear set is provided to increase the number of the gear stages, for example, the automatic transmission has favorable mountability. In particular, a required mountability of a transverse-mounted automatic transmission is obtained. The transverse-mounted automatic transmission is arranged in an engine compartment such that an axial direction thereof matches a vehicle width direction, and strict restriction is imposed on an axial dimension thereof.

In the embodiment that has been described so far, the plurality of friction plates 13, 23, 33 of the three clutches, which are the first, second, and third clutches 10, 20, 30, are arranged in parallel in the axial direction. However, a similar configuration can be obtained, for example, when the plurality of friction plates of two clutches that are the first and second clutches 10, 20 are arranged in parallel in in the axial direction. Thus, the similar effects can be exerted.

The vertical wall section 11c is provided with the radial oil passages 86a, 86b, 86c in the manner to completely overlap in the axial direction. However, the radial oil passages 86a, 86b, 86c may be provided to partially overlap in the axial direction. Also, in this case, compared to a case where the radial oil passages do not overlap at all in the axial direction, the increase in the thickness of the vertical wall section 11c and the increase in the axial dimension of the entire transmission are suppressed.

In this embodiment, the description has been made so far on the configuration in which the drum members 11, 21, 31 of the first, second, third clutches 10, 20, 30 are separately provided. However, these drum members may be formed integrally.

INDUSTRIAL APPLICABILITY

As it has been described so far, according to the present disclosure, it is possible to suppress the increase in the axial dimension of the automatic transmission that includes the plurality of clutches while suppressing the dimension of the automatic transmission in the radial direction of the clutches. Therefore, the present invention can suitably be used in a manufacturing industry field of this type of the automatic transmission or a vehicle on which this type of the automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 2 input shaft (power transmission shaft)
10 first clutch (one-side clutch)
11, 21, 31 drum member (drum section)
12, 22, 32 hub member (hub section)
13, 23, 33 friction plate
13c first through hole
13d second through hole
14, 24, 34 piston
20 second clutch (other-side clutch, first other-side clutch)
21b, 31c retaining support section
30 third clutch (other-side clutch, second other-side clutch)
37 return spring

The invention claimed is:

1. An automatic transmission comprising a one-side clutch in an axial direction and an other-side clutch in the axial direction, the one-side clutch and the other-side clutch being aligned in the axial direction on an axis of a power transmission shaft, each of the clutches including:
    a cylindrical drum section;
    a cylindrical hub section that opposes the drum section;
    a friction plate that is engaged between the drum section and the hub section in an axially slidable manner; and
    a piston that presses the friction plate, wherein
    the friction plate in the one-side clutch and the friction plate in the other-side clutch are arranged in parallel in the axial direction,
    the piston in the one-side clutch and the piston in the other-side clutch are arranged on one side in the axial direction of the friction plate in the one-side clutch and are arranged such that axial positions thereof overlap,
    the piston in the other-side clutch penetrates the friction plate in the one-side clutch in the axial direction,
    the other-side clutch is a first other-side clutch that is arranged on the one-side clutch side, and the automatic transmission further includes a second other-side clutch that is arranged on the other side in the axial direction of the first other-side clutch,
    the piston in the first other-side clutch penetrates the friction plate in the one-side clutch in the axial direction, and
    a piston in the second other-side clutch penetrates the friction plate in the one-side clutch and the friction plate in the first other-side clutch in the axial direction.

2. The automatic transmission according to claim 1, wherein
    the drum section in the one-side clutch and the drum section in the other-side clutch are formed as separate bodies and are configured to rotate integrally, and
    the drum section in the other-side clutch includes a retaining support section that is located between the friction plate in the other-side clutch and the friction plate in the one-side clutch, that extends radially inward from an inner circumferential side of the drum section in the other-side clutch, and that restrains sliding of the friction plate in the one-side clutch to the other axial side.

3. The automatic transmission according to claim 2, wherein
    the other-side clutch includes a return spring that urges the piston to a disengagement side,
    the friction plate of the other-side clutch is one of a plurality of friction plates, and
    the return spring is arranged between an adjacent two of the plurality of friction plates in the other-side clutch.

4. The automatic transmission according to claim 1, wherein a first penetration position, at which the piston in the first other-side clutch penetrates the friction plate in the one-side clutch, and a second penetration position, at which the piston in the second other-side clutch penetrates the friction plate in the one-side clutch, are located in a misaligned manner in a circumferential direction.

5. The automatic transmission according to claim 1, wherein
    the other-side clutch includes a return spring that urges the piston to a disengagement side,
    the friction plate of the other-side clutch is one of a plurality of friction plates, and
    the return spring is arranged between an adjacent two of the plurality of friction plates in the other-side clutch.

6. An automatic transmission comprising a one-side clutch in an axial direction and an other-side clutch in the axial direction, the one-side clutch and the other-side clutch being aligned in the axial direction on an axis of a power transmission shaft, each of the clutches including:
   a cylindrical drum section;
   a cylindrical hub section that opposes the drum section;
   a friction plate that is engaged between the drum section and the hub section in an axially slidable manner; and
   a piston that presses the friction plate, wherein
   the friction plate in the one-side clutch and the friction plate in the other-side clutch are arranged in parallel in the axial direction,
   the piston in the one-side clutch and the piston in the other-side clutch are arranged on one side in the axial direction of the friction plate in the one-side clutch and are arranged such that axial positions thereof overlap,
   the piston in the other-side clutch penetrates the friction plate in the one-side clutch in the axial direction,
   a vertical wall section of the drum section in the one-side clutch is provided to be orthogonal to the axis, and an inner circumferential portion, an intermediate portion, and an outer circumferential portion of the vertical wall section form rear surfaces of respective hydraulic chambers in the one-side clutch and the other-side clutch, and
   the hydraulic chambers overlap each other in the axial direction, and the hydraulic chamber in the other-side clutch is superimposed on an outer circumferential side of the hydraulic chamber of the one-side clutch.

7. The automatic transmission according to claim 6, wherein
   the other-side clutch is a first other-side clutch that is arranged on the one-side clutch side, and the automatic transmission further includes a second other-side clutch that is arranged on the other side in the axial direction of the first other-side clutch,
   the piston in the first other-side clutch penetrates the friction plate in the one-side clutch in the axial direction, and
   a piston in the second other-side clutch penetrates the friction plate in the one-side clutch and the friction plate in the first other-side clutch in the axial direction.

8. The automatic transmission according to claim 7, wherein
   the drum section in the one-side clutch and the drum section in the other-side clutch are formed as separate bodies and are configured to rotate integrally, and
   the drum section in the other-side clutch includes a retaining support section that is located between the friction plate in the other-side clutch and the friction plate in the one-side clutch, that extends radially inward from an inner circumferential side of the drum section in the other-side clutch, and that restrains sliding of the friction plate in the one-side clutch to the other axial side.

9. The automatic transmission according to claim 8, wherein
   the other-side clutch includes a return spring that urges the piston to a disengagement side,
   the friction plate of the other-side clutch is one of a plurality of friction plates, and
   the return spring is arranged between an adjacent two of the plurality of friction plates in the other-side clutch.

10. The automatic transmission according to claim 7, wherein a first penetration position, at which the piston in the first other-side clutch penetrates the friction plate in the one-side clutch, and a second penetration position, at which the piston in the second other-side clutch penetrates the friction plate in the one-side clutch, are located in a misaligned manner in a circumferential direction.

* * * * *